United States Patent
Chou et al.

(10) Patent No.: US 12,282,665 B2
(45) Date of Patent: Apr. 22, 2025

(54) MEMORY OPERATION METHOD AND MEMORY DEVICE FOR DATA MOVEMENT

(71) Applicant: SILICON MOTION INC., Hsinchu County (TW)

(72) Inventors: Po-Sheng Chou, Hsinchu County (TW); Hsiang-Yu Huang, Hsinchu County (TW); Yan-Wen Wang, Hsinchu County (TW)

(73) Assignee: SILICON MOTION INC., Hsinchu County (TW)

( * ) Notice: Subject to any disclaimer, the term of this patent is extended or adjusted under 35 U.S.C. 154(b) by 78 days.

(21) Appl. No.: 18/330,349

(22) Filed: Jun. 6, 2023

(65) Prior Publication Data

US 2024/0134538 A1 Apr. 25, 2024
US 2024/0231640 A9 Jul. 11, 2024

(30) Foreign Application Priority Data

Oct. 19, 2022 (TW) .................................. 111139699

(51) Int. Cl.
*G06F 3/06* (2006.01)
(52) U.S. Cl.
CPC ............ *G06F 3/0619* (2013.01); *G06F 3/064* (2013.01); *G06F 3/0653* (2013.01); *G06F 3/0679* (2013.01)
(58) Field of Classification Search
CPC ...... G06F 3/0619; G06F 3/064; G06F 3/0653; G06F 3/0679; G06F 12/0246; G06F 2212/1036; G06F 2212/7208; G06F 2212/7211; G06F 3/0616; G06F 3/061
See application file for complete search history.

(56) References Cited

U.S. PATENT DOCUMENTS

| | | | |
|---|---|---|---|
| 8,954,650 B2 | 2/2015 | Belgal et al. | |
| 9,361,182 B2 | 6/2016 | Hu et al. | |
| 10,853,236 B2 | 12/2020 | Park | |
| 2021/0090670 A1 | 3/2021 | Liang et al. | |
| 2021/0096761 A1* | 4/2021 | Byun | G06F 3/064 |
| 2021/0109675 A1* | 4/2021 | Jung | G06F 3/0659 |
| 2022/0083470 A1* | 3/2022 | Jeon | G06F 1/28 |
| 2022/0269443 A1* | 8/2022 | Chou | G11C 16/26 |
| 2022/0308782 A1* | 9/2022 | Song | G06F 3/0635 |
| 2023/0152996 A1* | 5/2023 | Kim | G06F 12/0851 711/154 |
| 2023/0153019 A1* | 5/2023 | Ma | G06F 3/0632 711/103 |
| 2023/0195324 A1* | 6/2023 | Lee | G06F 3/0653 711/103 |
| 2023/0297290 A1* | 9/2023 | Yoshida | G06F 3/0688 711/103 |

* cited by examiner

Primary Examiner — Tasnima Matin
(74) Attorney, Agent, or Firm — CKC & Partners Co., LLC

(57) ABSTRACT

A memory operation method, comprising: when a first super block of a memory device is a open block (or in programming state), obtaining a first read count of one of a plurality of first memory blocks in the first super block, wherein the first read count is a number of times that data of one of the first memory blocks is read out; determining whether the first read count is larger than a first threshold; and when the first read count is larger than the first threshold, moving a part of the data in the first super block to a safe area in the memory device, wherein the part of the data comprises data in the first memory block.

17 Claims, 3 Drawing Sheets

MEMORY OPERATION METHOD AND MEMORY DEVICE FOR DATA MOVEMENT

CROSS-REFERENCE TO RELATED APPLICATION

This application claims priority to Taiwan Application Serial Number 111139699, filed Oct. 19, 2022, which is herein incorporated by reference in its entirety.

BACKGROUND

Technical Field

The present disclosure relates to a non-volatile memory, especially a memory operation method and a related memory device that selectively moves internal data according to the read count of the memory.

Description of Related Art

There are many types of non-volatile memory, including flash memory, magnetoresistive random access memory, ferroelectric Random-Access Memory (RAM), resistive RAM and spin-Torque Transfer RAM (STT-RAM), etc. The non-volatile memory is applied as a storage medium of data storage device. Since the data in the non-volatile memory may be damaged with multiple reads, a solution is needed.

SUMMARY

One aspect of the present disclosure is a memory operation method, comprising: when a first super block of a memory device is a open block, obtaining a first read count of at least one of a plurality of first memory blocks in the first super block, wherein the first read count is a number of times that a data of the at least one of the plurality of first memory blocks has been read; determining whether the first read count is larger than a first threshold; and when the first read count is larger than the first threshold, moving at least one part data in the first super block to a safe area in the memory device, wherein the at least one part data comprises the data of the at least one of the plurality of first memory blocks.

Another aspect of the present disclosure is a memory device, comprising multiple memory dies and a controller. The memory dies comprises a plurality of memory blocks corresponding to multiple super blocks. The controller is coupled to the plurality of memory blocks though at least a memory channel. When a first super block of the super blocks is a open block, the controller is configured to determine whether a plurality of first read counts corresponding to the plurality of memory dies in the first super block is larger than a first threshold to selectively move a data in the first super block.

Another aspect of the present disclosure is a memory operation method, comprising: determining whether a first super block of a memory device is in a program state; when the first super block is in the program state, determining whether a plurality of first read counts of the first super block is larger than a first threshold, wherein the plurality of first read counts is a number of times that a data of a plurality of first memory blocks in the first super block, which corresponds to a plurality of chip enable, has been read; and selectively moving the data of the first super block according to the plurality of first read counts and the first threshold.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
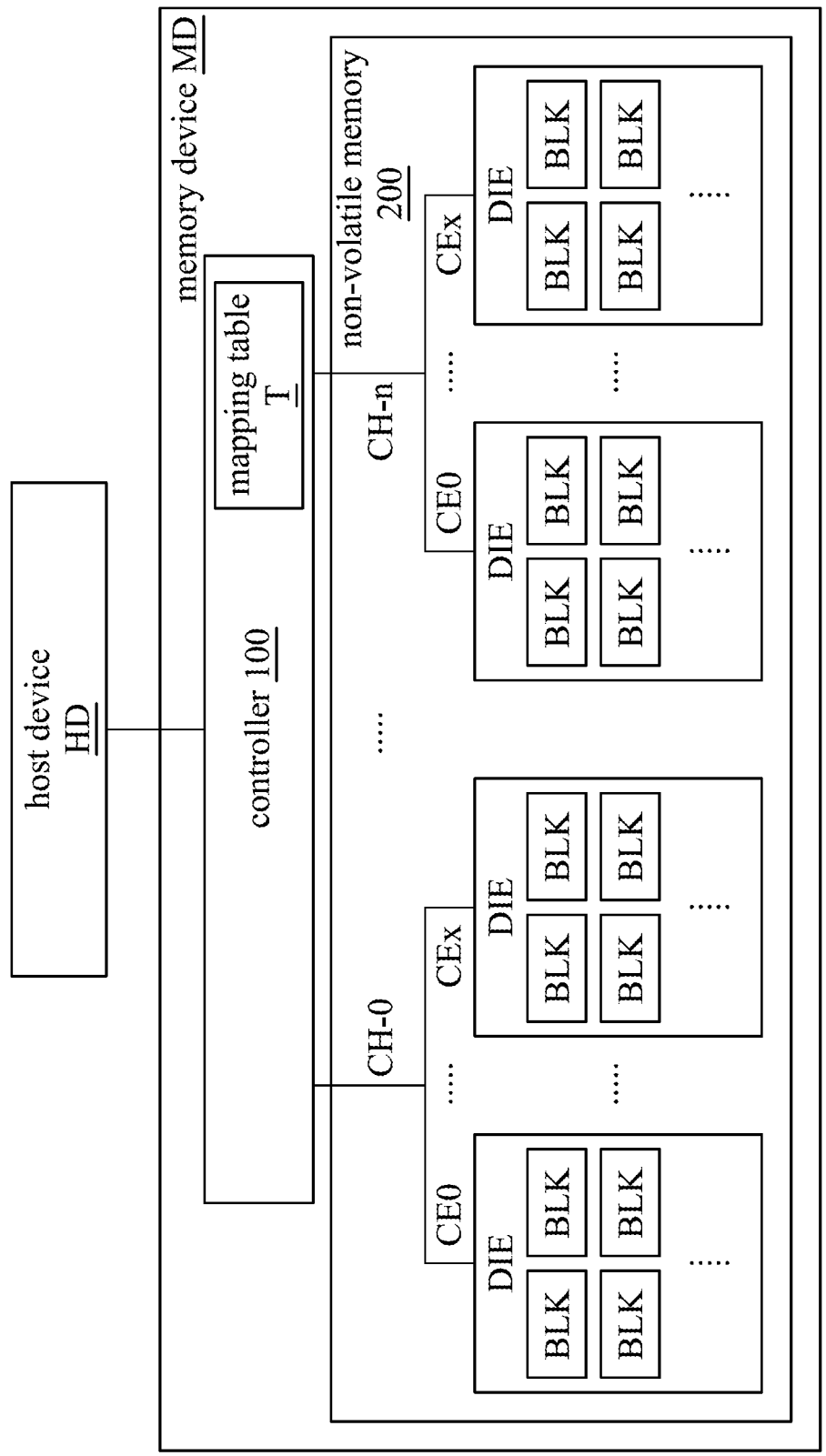
FIG. 1 is a schematic diagram of a memory device in some embodiments of the present disclosure.

FIG. 1 is a schematic diagram of a memory device MD in some embodiments of the present disclosure. The memory device MD include a controller 100 and a non-volatile memory 200. The controller 100 is coupled to the non-volatile memory 200, and is configured to access the non-volatile memory 200, so as to perform read, write (program) and/or clean operations.

In one embodiment, the controller 100 includes a processing circuit (e.g., microprocessor), a a storage device (e.g., read-only memory), a control logic circuit, a buffer memory and a transmission interface circuits. These components can be coupled to each other by bus bars. To keep the drawing simple and clear, these components are not shown in FIG. 1. The controller 100 is coupled to a host device HD, so that the memory device MD is used as a data storage medium of the host device HD, such as memory card, universal serial bus (USB) interface flash drive, solid-state drives, etc. The host device HD can be a smartphone, a wearable device, a tablet computer or a virtual reality device, etc.

Types of the non-volatile memory 200 include but not limited to: flash memory, magnetoresistive random access memory, ferroelectric RAM, resistive RAM and spin-Torque Transfer RAM (STT-RAM). In one embodiment, the non-volatile memory 200 include multiple memory units. The memory units can be implemented by a flash memory chip or flash memory die, such as the memory die DIE shown in FIG. 1. The storage space of memory units can be divided into multiple memory blocks BLK. Each of memory blocks BLK includes multiple memory pages. Taking the NAND memory structure as an example, memory page is the smallest unit when reading or writing data, and memory block is the smallest unit when erasing (or clearing) data. Since those skilled in the art can understand the structure and operation of the non-volatile memory, so it will not be described here.

The controller 100 stores a mapping table T, for example, a Logical-block-address to Physical-block-address (L2P Mapping Table). The mapping table T is configured to record a mapping relationship between physical addresses (i.e., the actual location of data storage in the memory device MD) and logical address of the non-volatile memory 200. The physical addresses can be at least composed of channel number, logical unit number (LUN), plane number, block number, page number and offset. In some other embodiments, the implementation of the physical addresses can be changed. For example, the physical addresses are composed of parts of channel number, logical unit number, plane number, block number, page number and offset.

As mentioned above, when the host device HD needs to access the data in the memory device MD, the host device HD translates a host command to the memory device MD, and the controller 100 will access the non-volatile memory 200 according to the host command to execute the operation corresponding to the host command (e.g., read, clear or write data). Specifically, the host command includes a logical address. After receiving the host command, the controller 100 first translates the host command into a memory operation command (referred to as the operation command), and finds out the corresponding physical address according to the mapping table T. Then, according to the operation command, the controller 100 controls the non-volatile memory 200 to read or write memory pages of a specified physical addresse in the non-volatile memory 200, or controls the non-volatile memory 200 to clear the memory block of a specified physical addresse in the non-volatile memory 200. The controller 100 will dynamically update the mapping table T to record the physical address and the logical address of each data.

In order to ensure the correctness of each data in the non-volatile memory 200, the controller 100 selectively moves the data from the original storage location to other "safe locations" according to the state of the non-volatile memory 200 (e.g., other memory blocks BLK that are less used). This operation is called "early refresh", and it is used to avoid errors in the data stored in the non-volatile memory 200 due to "reading interference". The controller 100 can determine whether to perform "early refresh" according to the write counts or read counts of each of memory blocks.

Specifically, the memory blocks and/or memory pages of the non-volatile memory 200 include multiple memory cells implemented by transistors. The amount of charge stored in a floating gate of the transistor determines a threshold voltage of the transistor, and the threshold voltage determines whether the data stored in the transistor is a bit "0" or a bit "1". When the controller 100 writes or reads the non-volatile memory 200, the controller 100 applies a voltage to the transistor, which may affect the amount of charges stored in the floating gate and may change the threshold voltage. Although the voltage applied to the transistor is small during the read operation, and the threshold voltage of the transistor will not be greatly changed immediately, after repeated and multiple readings (read operation), the threshold voltage of the transistor may still be gradually affected, resulting in errors in the data stored in the transistor. This phenomenon is the aforementioned "reading interference".

The memory device MD of the present disclosure determines whether to perform the early refresh according to the read count of the memory blocks BLK of the non-volatile memory 200, so as to avoid the "reading interference" affecting the correctness of the data stored in the memory device MD.

Figure 2:
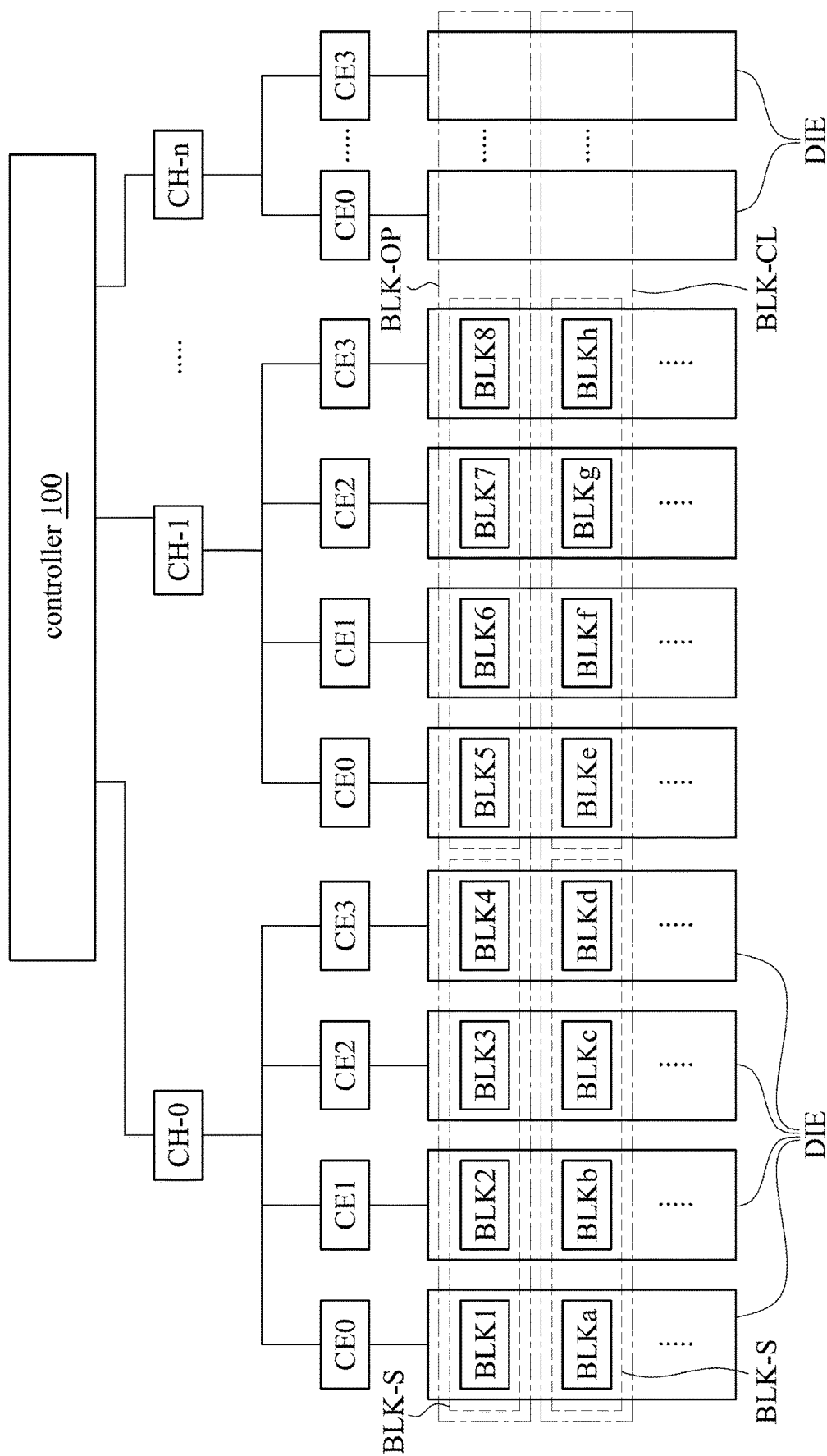
FIG. 2 is a schematic diagram of a memory device in some embodiments of the present disclosure.

In order to clearly explain the technology of the present disclosure, the detailed structure in the memory device MD is further explained here. FIG. 2 is a schematic diagram of the memory device MD in some embodiments of the present disclosure. The memory device MD is coupled to the non-volatile memory 200 through one or more memory channels. In one embodiment, the memory device MD is a multi-channel accessing architecture. In other words, the controller 100 is coupled to the non-volatile memory 200 through multiple memory channels CH-0-CH-n, and each of the memory channels CH-0-CH-n also include multiple chip enables CE0-CEx. The symbols "n", "x" can represent positive integers greater than or equal to 1. As shown in FIG. 2, a memory channel corresponds to four chip enables, that is, x is equal to "3" (CE0-CE3). "Chip enable" can be a pin set between the controller 100 and the memory dies DIE. Each of chip enables CE0-CEx is configured to transmit a chip-enable signal to one or more corresponding memory dies to access the memory dies DIE.

As shown in FIG. 2, the controller 100 is coupled to the memory die DIE through multiple memory channels CH-0-CH-n and multiple chip enables CE0-CE3 to access multiple memory blocks in the memory dies DIE (e.g., BLK1-BLK8, BLKa-BLKh shown in FIG. 2). In some embodiments, the multiple memory blocks BLK1-BLK8 adjacent to the physical address may correspond to one or more logical addresses, so as be used as one or more super blocks BLK-S. Similarly, BLKa-BLKh can correspond to one or more logical addresses and be used as one or multiple super blocks BLK-S. Accordingly, by the multi-channel access technology, the controller 100 can access data to the non-volatile memory 200 more quickly.

For example, four memory blocks BLK1-BLK4 located in different memory dies DIE can correspond to the same logical address as a super block BLK-S. Similarly, another three groups of memory blocks BLK5-BLK8, BLKa-BLKd and BLKe-BLKh can correspond to another three logical addressesm, respectively, as another three super blocks BLK-S. The number of memory blocks included in the super blocks BLK-S can be adjusted, not limited to the "four" shown in FIG. 2.

Figure 3:
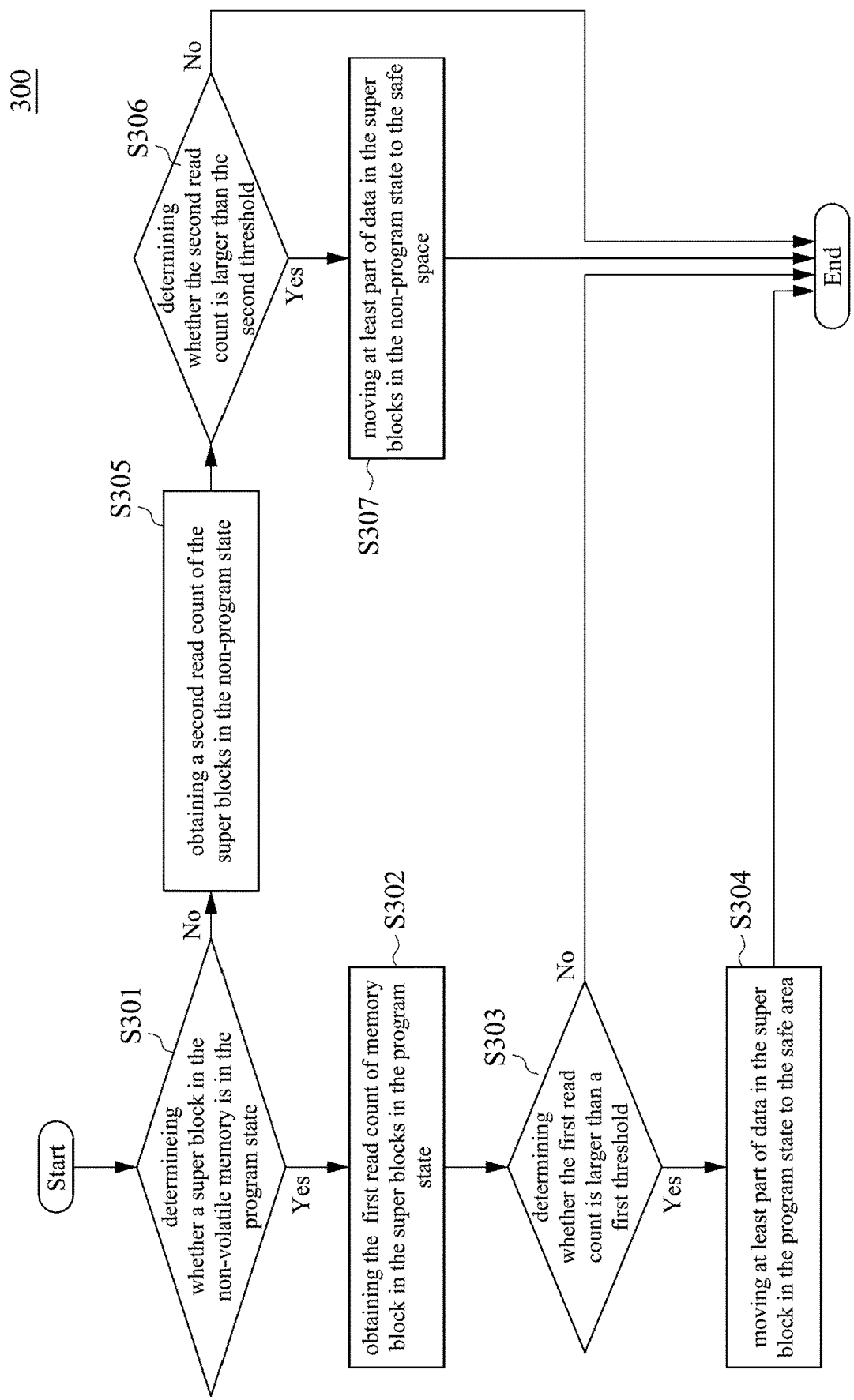
FIG. 3 is a flowchart illustrating a memory operation method in some embodiments of the present disclosure.

FIG. 3 is a flowchart illustrating a memory operation method 300 in some embodiments of the present disclosure. The memory operation method 300 of determining whether to perform early refresh on the non-volatile memory 200 according to some embodiments of the present disclosure is described here according to FIG. 2 and FIG. 3.

In some embodiments, the controller 100 executes the memory operation method 300 according to a command transmitted from the host device HD. In some embodiments, when the host device HD wants to write a large amount of data to the memory device MD (e.g., execute a detection program), and also detect the data access speed of the memory device MD, the host device HD simultaneously transmits the command to the memory device MD to control the memory device MD to execute the memory operation method 300. In some embodiments, the memory device MD can automatically execute the memory operation method 300. For example, when the memory device MD determines that the host device HD is executing the detection program, the memory device MD automatically executes the memory operation method 300 to determine whether it is necessary to perform the early refresh.

In step S301, the controller 100 first determines whether a super block BLK-S in the non-volatile memory 200 is in the program state, thus belongs to an "open block BLK-OP". As shown in FIG. 2, when the controller 100 is writing one or more super blocks BLK-S, and the writing operation has not been completely finished, the one or more super blocks BLK-S being written are in the program state, and form (belong to) the open block BLK-OP. On the other hand, other super blocks BLK-S that are not in the program state form (belong to) close block(s) BLK-CL.

If the result of step S301 is yes, the controller 100 executes step S302. In step S302, the controller 100 obtains the respective first read count(s) of one or more memory blocks BLK1-BLK4 in the super blocks BLK-S in the program state. The first read count is the number of times the data of each memory block BLK1-BLK4 has been read. For example, the memory blocks BLK1-BLK4 have been read 22, 3, 7 and 2 times respectively, then the controller 100 will obtain four first read counts: 22, 3, 7 and 2.

In the embodiment shown in FIG. 2, different memory blocks in each of the super blocks BLK-S belong to different memory dies DIE. Each the first read count is the number of reads of "one of the memory blocks" of the super blocks BLK-S in the program state, but the present disclosure is not limited to this. In some embodiments, each super blocks BLK-S includes multiple memory blocks belonging to the same memory die DIE. Each first read count can be the number of read times that "data of one or more memory blocks belonging/corresponding to the same memory die DIE", which is in one super block BLK-S in the program state, has been read. That is, if two memory blocks in the same memory die DIE belong to the same super block BLK-S, then the first read count can be used to represent a sum of the read times of data of the two memory blocks has been read.

In the embodiment shown in FIG. 2, different memory blocks in each of the super blocks BLK-S correspond to different chip enables CE0-CE3, but the present disclosure is not limited to this. In some other embodiments, each super blocks BLK-S includes multiple memory blocks belonging to the same chip enable. Each first read count is the number of read times that "data of one or more memory blocks corresponding to the same chip enable", which is in the super blocks BLK-S in the program state, has been read.

In step S303, the controller 100 determining whether the first read count of the super block BLK-S in the program state is larger than a first threshold, so as to selectively move the super block BLK-S in the program state according to the first read count and the first threshold (i.e., decide whether to perform the early refresh).

If the result of step S303 is yes, the controller 100 executes step S304 to move at least part of data in the super block BLK-S in the program state to the safe area in the memory device MD. When step S304 finished, the controller 100 can end the memory operation method 300. In some embodiments, the aforementioned "safe area" refers to one or more other memory blocks in the non-volatile memory 200 that do not store data, and the sum of the read times of the one or more other memory blocks is less than the first read count. On the other hand, if all of first read counts are less than the first threshold (that is, the the result of step S303 is "no"), then the controller 100 ends the memory operation method 300.

Specifically, if the controller 100 obtains multiple first read counts of the super blocks BLK-S in the program state simultaneously, then the controller 100 compares each first read count with the first threshold, respectively. If one of the first read counts is larger than the first threshold, the controller 100 performs the early refresh on the super block BLK-S in the program state, so as to move at least part of data in the super block BLK-S to the safe area. The moved data includes data of the memory block whose first read count is larger than the first threshold.

For example, for the super blocks BLK-S in the program state in the open block BLK-OP, the first read counts of the memory blocks BLK1-BLK4 are "22, 3, 7, 2" respectively, and the first threshold is "20". In one embodiment, since the first read count of the memory block BLK1 larger than the first threshold, the controller 100 moves the data of all memory blocks of the open block BLK-OP to the safe area, but the present disclosure is not limited to this. In some other embodiments, the controller 100 can move data in the memory block BLK1, and move data in one or more of memory blocks BLK2-BLK4 together. In other embodiments, the controller 100 can only move the data of the memory block BLK1, and sets/adjusts the area of the super blocks BLK-S.

On the other hand, in the aforementioned step S301, if the controller 100 determines that the super block BLK-S does not belong to the program state (e.g., not in the program state, referred to here as "non-program state"), that is, if the controller 100 determines that the super block BLK-S belongs to the close block BLK-CL, the controller 100 executes step S305. In step S305, the controller 100 obtains a second read count of the super blocks BLK-S in the non-program state in the close block BLK-CL.

In particular, the method of determining the second read count is different from the method of determining the first read count. The second read count is a read count sum of the number of read times that "multiple memory blocks (e.g. BLKa-BLKd) in the super block BLK-S in the non-program state are read through the same memory channel (e.g. CH-0)." In other words, the controller 100 is configured to sum the number of read times that data in all memory blocks corresponding to the same memory channel in one super block BLK-S in the non-program state has been read, and uses the number of read times as the second read count. For example, the memory blocks BLKa-BLKd all correspond to the same memory channel CH-0, and have been read 5, 1, 3, 7 times respectively, then the second read count is the sum of the above four values, namely "16".

The controller 100 selectively moves the data of the super blocks BLK-S in the non-program state according to the second read count and the second threshold different from the first threshold. Specifically, in step S306, the controller 100 determines whether the second read count is larger than the second threshold. In one embodiment, the second threshold is less than the first threshold, for example, the first threshold is "20", and the second threshold is "15".

In step S307, if the second read count is larger than the second threshold, the controller 100 moves at least part of the data in the super block BLK-S in the non-program state to the safe space, that is, perform the early refresh. After step S307 finished, the controller 100 ends the memory operation method 300. For example, the controller 100 moves the data of one or more of the memory blocks BLKa-BLKd in the super block BLK-S in the non-program state to other memory blocks, but the present disclosure is not limited to this. In some embodiments, the controller 100 can simultaneously move multiple super blocks BLK-S in the close block BLK-CL. The multiple super blocks BLK-S include the super blocks BLK-S with the second read count greater than the second threshold. On the other hand, if the second read count is less than the second threshold, the controller 100 ends the memory operation method 300.

When the memory operation method 300 of the present disclosure determines whether to perform the early refresh on the open block BLK-OP, it is to record the first read count of "single memory block, or memory blocks corresponding to the same memory die, or memory blocks corresponding to the same chip enable" in a super block BLK-S to determine whether data needs to be moved. Accordingly, the controller 100 can move the data in the open block BLK-OP when necessary, so as to reduce the negative impact (e.g., the data access speed slows down, or writing is temporarily interrupted) that may be produced when the controller 100 determines the data access speed and writes to the open block BLK-OP at the same time, so as to ensure the performance of the memory device MD.

In addition, the memory operation method of the present disclosure can use different determination methods for the open block BLK-OP and the close block BLK-CL respectively. When determining whether to perform the early refresh on the close block BLK-CL, the controller 100 records a sum of "multiple read times corresponding to the same memory channel" in one super block BLK-S, and uses the sum of number of read times as the second read count. Then, the controller 100 compares the second read count with the second threshold to quickly confirm whether to perform the early refresh on the close block BLK-CL.

In some embodiments, when the host device HD is executing a detection program to detect the data access speed of the memory device MD, If the first read counts obtained by the controller 100 are all less than the first threshold, the controller 100 will not perform the early refresh on the super blocks BLK-S in the program state. In other words, the controller 100 will maintain the data in the super block BLK-S until the controller 100 or the host device HD detects/records the data access speed of the memory device MD. Or, the controller 100 performs the early refresh when the super blocks BLK-S is no longer in the program state.

Furthermore, in the foregoing embodiments, the controller 100 first determines whether the super block BLK-S belong to the program state, and then obtains the first read count or the second read count according to the program state or non-program state. In some other embodiments, since most of the super blocks BLK-S in the non-volatile memory 200 are in the non-program state, the controller 100 can obtain in advance the read count sum of the read times of the super blocks BLK-S corresponding to the same memory channel, that is, the second read count. In other words, step S305 can be performed before step S301. Accordingly, if in subsequent steps, the super block BLK-S is indeed determined to be in the non-program state, step S306 can be directly performed.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A memory operation method, comprising:
   when a first super block of a memory device is an open block, obtaining a first read count of at least one of a plurality of first memory blocks in the first super block, wherein the first read count is a number of read times that a data of the at least one of the plurality of first memory blocks has been read;
   determining whether the first read count is larger than a first threshold;
   when the first read count is larger than the first threshold, moving at least one part data in the first super block to a safe area in the memory device, wherein the at least one part data comprises the data of the at least one of the plurality of first memory blocks;
   obtaining a read count sum of a number of read times that a data of a plurality of second memory blocks in a second super block has been read through a memory channel as a second read count, wherein the second super block is not in a program state; and
   selectively moving a data of the second super block according to the second read count and a second threshold, wherein the second threshold is different from the first threshold.

2. The memory operation method of claim 1, wherein obtaining the first read count of the at least one of the plurality of first memory blocks in the first super block comprises:
   obtaining a number of read times that one or more of the plurality of first memory blocks belonging to a memory die of the memory device in the first super block, and uses the number of read times that the one or more of the plurality of first memory blocks as the first read count.

3. The memory operation method of claim 1, wherein obtaining the first read count of the at least one of the plurality of first memory blocks in the first super block comprises:
   obtaining a number of read times that one or more of the plurality of first memory blocks belonging to a chip enable of the memory device in the first super block, and uses the number of read times that the one or more of the plurality of first memory blocks as the first read count.

4. The memory operation method of claim 1, wherein the second super block is not in a program state.

5. The memory operation method of claim 1, wherein selectively moving the data of the second super block according to the second read count and a second threshold comprises:
   determining whether the second read count is larger than the second threshold, wherein the second threshold is less than the first threshold; and
   when the second read count is larger than the second threshold, moving at least one part data in the second super block to the safe area in the memory device.

6. A memory device, comprising:
   a plurality of memory dies comprising a plurality of memory blocks corresponding to a plurality of super blocks, wherein a first part of the plurality of memory blocks in a first super block of the plurality of super blocks belongs to one of the plurality of memory dies or one of a plurality of chip enables; and
   a controller coupled to the plurality of memory blocks though at least a memory channel, wherein when the first super block of the plurality of super blocks is an open block, the controller is configured to determine whether a read count sum of a plurality of first read counts corresponding to the first part of the plurality of memory blocks is larger than a first threshold to selectively move a data in the first super block.

7. The memory device of claim 6, wherein when the read count sum of of the plurality of first read counts is larger than the first threshold, the controller is configured to move at least one part data in the first super block to a safe area in the memory device.

8. The memory device of claim 6, wherein all of the plurality of first read counts is less than the first threshold, the controller is configured to maintain the data in the first super block until a data access speed of the memory device is recorded.

9. The memory device of claim 6, wherein the plurality of super blocks further comprises a second super block, the controller is configured to determine whether a second read count of the second super block corresponding to the at least a memory channel is larger than a second threshold to selectively move a data of the second super block, and the second threshold is less than the first threshold.

10. The memory device of claim 9, wherein the controller is further configured to determine the second super block is not in a program state.

11. The memory device of claim 9, wherein the controller is configured to sum a number of read times that data in the plurality of memory blocks in the second super block, which corresponds to a same one of the at least a memory channel, has been read, and uses the number of read times as the second read count.

12. A memory operation method, comprising:
determining whether a first super block of a memory device is in a program state, wherein a first part of a plurality of first memory blocks in the first super block belongs to one of a plurality of memory dies or one of a plurality of chip enables;
when the first super block is in the program state, determining whether a read count sum of a plurality of first read counts of the first super block is larger than a first threshold, wherein the plurality of first read counts is a number of read times that a data of the plurality of first memory blocks in the first super block has been read; and
selectively moving the data of the first super block according to the read count sum of the plurality of first read counts and the first threshold.

13. The memory operation method of claim 12, wherein selectively moving the data of the first super block according to the read count sum of the plurality of first read counts and the first threshold comprises:
when the read count sum of of the plurality of first read counts is larger than the first threshold, moving at least one part data in the first super block to a safe area in the memory device.

14. The memory operation method of claim 12, wherein selectively moving the data of the first super block according to the read count sum of the plurality of first read counts and the first threshold comprises:
wherein all of the plurality of first read counts is less than the first threshold, maintaining the data in the first super block until a data access speed of the memory device is recorded.

15. The memory operation method of claim 12, further comprising:
determining whether a second read count of a second super block in the memory device corresponding to a memory channel is larger than a second threshold to selectively move a data of the second super block, wherein the second threshold is less than the first threshold.

16. The memory operation method of claim 15, wherein the second super block is not in the program state.

17. The memory operation method of claim 15, further comprises:
summing a number of read times that a data in a plurality of second memory blocks in the second super block, which corresponds to the memory channel, has been read, and uses the number of read times as the second read count.

* * * * *